United States Patent
Wetzel et al.

(10) Patent No.: US 10,465,652 B2
(45) Date of Patent: Nov. 5, 2019

(54) VORTEX GENERATORS FOR WIND TURBINE ROTOR BLADES HAVING NOISE-REDUCING FEATURES

(71) Applicant: General Electric Company, Schenectady, NY (US)

(72) Inventors: Drew Adam Wetzel, Easley, SC (US); Kevin Wayne Kinzie, Moore, SC (US); Jonathan Glenn Luedke, Simpsonville, SC (US); Andreas Herrig, Garching bei Munchen (DE); Benoit Philippe Petitjean, Moosburg (DE)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 15/415,961

(22) Filed: Jan. 26, 2017

(65) Prior Publication Data

US 2018/0209398 A1    Jul. 26, 2018

(51) Int. Cl.
*F03D 1/06* (2006.01)

(52) U.S. Cl.
CPC ......... *F03D 1/0633* (2013.01); *F03D 1/0675* (2013.01); *F05B 2240/221* (2013.01); *F05B 2240/30* (2013.01); *F05B 2240/32* (2013.01); *F05B 2250/121* (2013.01); *F05B 2250/184* (2013.01); *F05B 2260/96* (2013.01); *Y02E 10/721* (2013.01)

(58) Field of Classification Search
CPC ......... F05D 2240/305; F05D 2240/306; F05B 2240/221; F05B 2240/32; F05B 2250/184; F05B 2250/121
See application file for complete search history.

(56) References Cited

U.S. PATENT DOCUMENTS

| 175,355 A | 3/1876 | King |
| 573,562 A | 12/1896 | Wittram |
| 1,861,065 A | 5/1932 | Poot |

(Continued)

FOREIGN PATENT DOCUMENTS

| DE | 4440744 A1 | 5/1996 |
| DE | 102006043462 | 3/2008 |

(Continued)

OTHER PUBLICATIONS

Risoe National Laboratory for Sustainable Energy, "Controllable Rubber Trailing Edge Flap May Ease Stress on Wind Turbine Blades". Renewable Energy World.com, pp. 1-3, Feb. 17, 2010.

(Continued)

*Primary Examiner* — Bryan M Lettman
*Assistant Examiner* — Timothy P Solak
(74) *Attorney, Agent, or Firm* — Dority & Manning, P.A.

(57) ABSTRACT

Vortex generators for wind turbine rotor blades having noise-reducing features are mounted within a laminar flow region on either the pressure side or the suction side of the rotor blade and have a base portion with at least one airflow modifying element extending therefrom. The base portion has a leading edge and a trailing edge extending in a first direction. Further, the base portion includes one or more edge features formed within either or both of the leading or trailing edges. Moreover, the edge features are non-parallel with respect to the first direction so as to reduce laminar boundary layer instability noise.

17 Claims, 5 Drawing Sheets

(56) References Cited

U.S. PATENT DOCUMENTS

| | | | |
|---|---|---|---|
| RE19,412 E | 1/1935 | Zaparka |
| 2,071,012 A | 2/1937 | Adams |
| 2,225,312 A | 12/1940 | Mason |
| 2,238,749 A | 4/1941 | Peltier |
| D131,271 S | 2/1942 | Colura |
| 2,312,219 A | 4/1943 | Sensenich |
| 2,469,167 A | 5/1949 | Little |
| 2,899,128 A | 8/1959 | Vaghi |
| 4,089,618 A | 5/1978 | Patel |
| 4,204,629 A | 5/1980 | Bridges |
| 4,618,313 A | 10/1986 | Mosiewicz |
| 4,720,244 A | 1/1988 | Kluppel et al. |
| 4,962,826 A | 10/1990 | House |
| 5,088,665 A | 2/1992 | Vijgen et al. |
| 5,320,491 A | 6/1994 | Coleman et al. |
| 5,328,329 A | 7/1994 | Monroe |
| 5,522,266 A | 6/1996 | Nicholson et al. |
| 5,533,865 A | 7/1996 | Dassen et al. |
| 5,819,357 A | 10/1998 | Gould |
| 6,023,898 A | 2/2000 | Josey |
| 6,352,601 B1 | 3/2002 | Ray |
| 6,491,260 B2 | 12/2002 | Borchers et al. |
| 6,540,288 B1 | 4/2003 | Tobin |
| 6,729,846 B1 | 5/2004 | Wobben |
| 6,733,240 B2 | 5/2004 | Gilebe |
| 6,779,978 B2 | 8/2004 | Camargo Do Amarante |
| 6,789,769 B2 | 9/2004 | Mau et al. |
| 6,800,956 B2 | 10/2004 | Bartlett |
| 6,830,436 B2 | 12/2004 | Shibata et al. |
| 7,059,833 B2 | 6/2006 | Stiesdal et al. |
| 7,328,770 B2 | 2/2008 | Owens et al. |
| 7,351,041 B2 | 4/2008 | Uselton et al. |
| 7,413,408 B1 | 8/2008 | Tafoya |
| 7,458,777 B2 | 12/2008 | Herr |
| 7,585,157 B2 | 9/2009 | Quell et al. |
| 7,632,068 B2 | 12/2009 | Bak et al. |
| 7,637,721 B2 | 12/2009 | Driver et al. |
| 7,740,206 B2 | 6/2010 | Eaton et al. |
| 7,878,457 B2 | 2/2011 | Narramore |
| 7,909,576 B1 | 3/2011 | van der Bos et al. |
| 7,931,970 B2 | 4/2011 | Schlingloff et al. |
| 7,976,276 B2 | 7/2011 | Riddell et al. |
| 7,976,283 B2 | 7/2011 | Huck |
| 8,047,801 B2 | 11/2011 | Fang et al. |
| 8,047,804 B2 | 11/2011 | Bagepalli et al. |
| 8,083,488 B2 | 12/2011 | Fritz |
| 8,162,590 B2 | 4/2012 | Haag |
| 8,267,657 B2 | 9/2012 | Huck et al. |
| 8,414,261 B2 | 4/2013 | Bonnet |
| 8,430,638 B2 | 4/2013 | Drobietz et al. |
| 8,523,515 B2 | 9/2013 | Drobietz et al. |
| 8,834,117 B2 | 9/2014 | Yarbrough et al. |
| 9,494,132 B2 | 11/2016 | Riddell et al. |
| 9,505,485 B2 | 11/2016 | Dorsett |
| 2001/0008032 A1 | 7/2001 | Llewellyn-Jones et al. |
| 2003/0099546 A1* | 5/2003 | Stiesdal ............ F03D 1/0641 416/228 |
| 2003/0175121 A1 | 9/2003 | Shibata et al. |
| 2004/0219059 A1 | 11/2004 | Barringer et al. |
| 2004/0253114 A1 | 12/2004 | Gunneskov et al. |
| 2007/0025858 A1 | 2/2007 | Driver et al. |
| 2007/0041823 A1 | 2/2007 | Miller |
| 2007/0065290 A1 | 3/2007 | Herr |
| 2007/0077150 A1 | 4/2007 | Llorente Gonzalez |
| 2007/0125919 A1 | 6/2007 | Hopkins |
| 2007/0294848 A1 | 12/2007 | Dumler |
| 2008/0001363 A1 | 1/2008 | Bhate |
| 2008/0061192 A1 | 3/2008 | Sullivan |
| 2008/0080977 A1 | 4/2008 | Bonnet |
| 2008/0107540 A1 | 5/2008 | Bonnet |
| 2008/0166241 A1 | 7/2008 | Herr et al. |
| 2008/0175711 A1 | 7/2008 | Godsk |
| 2008/0187442 A1 | 8/2008 | Standish et al. |
| 2008/0298967 A1 | 12/2008 | Matesanz Gil et al. |
| 2008/0317600 A1 | 12/2008 | Enevoldsen et al. |
| 2009/0016891 A1 | 1/2009 | Parsania et al. |
| 2009/0068018 A1 | 3/2009 | Corten |
| 2009/0074585 A1 | 3/2009 | Koegler et al. |
| 2009/0087314 A1 | 4/2009 | Haag |
| 2009/0097976 A1 | 4/2009 | Driver et al. |
| 2009/0104038 A1 | 4/2009 | Grabau |
| 2009/0126131 A1 | 5/2009 | Delaere et al. |
| 2009/0169393 A1 | 7/2009 | Bagepalli et al. |
| 2009/0274559 A1 | 11/2009 | Petsche et al. |
| 2010/0028161 A1 | 2/2010 | Vronsky et al. |
| 2010/0068042 A1 | 3/2010 | Bruck et al. |
| 2010/0101037 A1 | 4/2010 | Gross et al. |
| 2010/0104436 A1 | 4/2010 | Herr et al. |
| 2010/0143144 A1 | 6/2010 | Anjuri et al. |
| 2010/0296940 A1 | 11/2010 | Zuteck |
| 2010/0329879 A1 | 12/2010 | Presz, Jr. et al. |
| 2011/0006165 A1 | 1/2011 | Ireland |
| 2011/0018282 A1 | 1/2011 | Hayashi et al. |
| 2011/0042524 A1 | 2/2011 | Hemmelgarn et al. |
| 2011/0142637 A1 | 6/2011 | Riddell et al. |
| 2011/0142666 A1 | 6/2011 | Drobietz et al. |
| 2011/0211954 A1* | 9/2011 | Bonnet ............... F03D 1/0675 416/1 |
| 2011/0223030 A1 | 9/2011 | Huck et al. |
| 2011/0268558 A1 | 11/2011 | Driver et al. |
| 2012/0027590 A1 | 2/2012 | Bonnet |
| 2012/0134817 A1 | 5/2012 | Bagepalli et al. |
| 2012/0201690 A1 | 8/2012 | Fuglsang et al. |
| 2012/0257977 A1 | 10/2012 | Jensen et al. |
| 2013/0156593 A1 | 6/2013 | Gupta et al. |
| 2014/0328687 A1 | 11/2014 | Tobin et al. |
| 2015/0010407 A1 | 1/2015 | Zamora Rodriguez et al. |
| 2015/0078913 A1* | 3/2015 | Enevoldsen ......... F03D 1/0608 416/241 R |
| 2015/0167633 A1* | 6/2015 | Tobin ................. F03D 1/0675 416/229 R |
| 2015/0292476 A1 | 10/2015 | Obrecht et al. |
| 2015/0308403 A1* | 10/2015 | Enevoldsen ......... F03D 7/0252 416/1 |
| 2016/0177914 A1* | 6/2016 | Enevoldsen ......... F03D 1/0633 416/228 |
| 2016/0215758 A1 | 7/2016 | Corten |
| 2016/0222941 A1 | 8/2016 | Tobin et al. |
| 2016/0312763 A1 | 10/2016 | Arce et al. |
| 2018/0038341 A1 | 2/2018 | Fukami et al. |

FOREIGN PATENT DOCUMENTS

| | | |
|---|---|---|
| EP | 0652367 A1 | 5/1995 |
| EP | 0947693 A2 | 10/1999 |
| EP | 1674723 A2 | 6/2006 |
| EP | 1944505 A1 | 7/2008 |
| EP | 2028366 A1 | 2/2009 |
| EP | 2053240 A1 | 4/2009 |
| EP | 2098721 A2 | 9/2009 |
| EP | 2138714 A1 | 12/2009 |
| EP | 2216545 | 8/2010 |
| EP | 2253838 A1 | 11/2010 |
| EP | 2270312 A1 | 1/2011 |
| EP | 2548801 A1 | 1/2013 |
| FR | 2863319 | 6/2005 |
| JP | 2000120524 | 4/2000 |
| JP | 2003254225 A | 10/2003 |
| JP | 2008115783 A | 5/2008 |
| WO | WO98/21091 | 5/1998 |
| WO | WO0015961 A1 | 3/2000 |
| WO | WO01/16482 A1 | 3/2001 |
| WO | WO2004/088130 A1 | 10/2004 |
| WO | WO2006/002621 A1 | 1/2006 |
| WO | WO 2007/140771 A1 | 12/2007 |
| WO | WO2008/035149 A2 | 3/2008 |
| WO | WO2008/113349 A2 | 9/2008 |
| WO | WO2008/113350 A2 | 9/2008 |
| WO | WO2008/131800 A1 | 11/2008 |
| WO | WO2009/025549 A1 | 2/2009 |
| WO | WO2010/063600 A2 | 6/2010 |
| WO | WO 2015030573 | * 3/2015 ............... F03D 1/06 |

(56) References Cited

FOREIGN PATENT DOCUMENTS

OTHER PUBLICATIONS

Risoe National Laboratory for Sustainable Energy, "Successful Wind Tunnel Test of Controllable Rubber Trailing Edge Flap for Wind Turbine Blades". Science Daily, pp. 1-2, Feb. 19, 2010.
Risoe National Laboratory for Sustainable Energy, the Technical University of Denmark, "Flexible Trailing Edge Flap for Blades to Make Wind PPower Cheaper". Science Daily, pp. 1-2, Apr. 7, 2011.
Samsung Wind Turbine 2.5MW Brochure , www.shi.Samsung.co.kr.
International Search Report and Written Opinion issued in connection with corresponding PCT Application No. PCT/US18/30087 dated Jan. 29, 2019.

* cited by examiner

VORTEX GENERATORS FOR WIND TURBINE ROTOR BLADES HAVING NOISE-REDUCING FEATURES

FIELD OF THE INVENTION

The present disclosure relates in general to wind turbine rotor blades, and more particularly to vortex generators for wind turbine rotor blades having noise-reducing features.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

In many cases, accessory components are attached to the rotor blades of wind turbines to perform various functions during operation of the wind turbine. For example, it is known to change the aerodynamic characteristics of wind turbine rotor blades by adding protrusions or other structures (often referred to as "vortex generators") to the surface of the blade in order to increase the energy conversion efficiency during normal operation of the wind turbine by increasing the lift force of the blades while decreasing the drag force. Vortex generators serve to increase the attached-flow region and to reduce the detached-flow region by moving the point of flow separation nearer to the trailing edge of the blade or to delay it from occurring altogether. In particular, vortex generators create local regions of longitudinally rotating, turbulent airflow over the surface of the blade as a means to delay flow separation and thus optimize aerodynamic airflow around the blade contour.

Laminar boundary layer instability noise occurs, however, when flow instabilities are scattered by a uniform discontinuity (e.g. the edge of a vortex generator panel or other blade add-on component) on the rotor blade surface. These scattered acoustic waves travel upstream, where they interact with and amplify the initial amplitude of the flow instabilities. The result is a feedback loop that produces multiple acoustic tones, regularly-spaced in frequency, which create undesirable noise for the wind turbine.

Thus, an improved vortex generator or blade add-on that addresses the aforementioned issues would be advantageous. Specifically, vortex generators for wind turbine rotor blades having noise-reducing features would be desired.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a rotor blade assembly for a wind turbine. The rotor blade assembly includes a rotor blade having surfaces defining a pressure side, a suction side, a leading edge, and a trailing edge extending between a blade tip and a blade root. The rotor blade assembly also includes at least one vortex generator mounted within a laminar flow region on either or both of the pressure side or the suction side of the rotor blade. As used herein, the laminar flow region encompasses areas of the rotor blade where laminar airflow transitions to turbulent airflow. Further, the vortex generator includes a base portion and at least one airflow modifying element extending from the base portion. Moreover, the base portion has a leading edge and a trailing edge extending generally in a first direction. Thus, the base portion includes one or more edge features formed within at least one of the leading edge or trailing edge, with the one or more edge features being non-parallel with respect to the first direction so as to reduce laminar boundary layer instability noise.

In one embodiment, the base portion may include one or more edge features formed within both the leading edge and the trailing edge thereof. In another embodiment, the base portion may include edge features formed around an entire periphery thereof.

In further embodiments, the edge features may include serrations, recesses, slits, slots, holes, channels, protrusions, ribs, or similar. More specifically, in certain embodiments, the edge features may have any suitable shape, including but not limited to U-shape, V-shape, C-shape, sinusoidal shape, rectangular shape, or a square shape.

In yet another embodiment, the base portion of the vortex generator may include a plurality of edge features formed within at least one of the leading edge or trailing edge thereof, with the plurality of edge features having a random pattern. Alternatively, the plurality of edge features may have a uniform pattern.

In additional embodiments, the edge features may taper towards the pressure or suction sides of the rotor blade. In yet another embodiment, the airflow modifying element(s) may include a fin extending generally perpendicular from the base portion.

In another aspect, the present disclosure is directed to a rotor blade assembly for a wind turbine. The rotor blade assembly includes a rotor blade having surfaces defining a pressure side, a suction side, a leading edge, and a trailing edge extending between a blade tip and a blade root. Further, the rotor blade assembly includes at least one blade add-on component mounted within a laminar flow region on at least one of the pressure side or the suction side of the rotor blade. As mentioned, the laminar flow region encompasses areas of the rotor blade where laminar airflow transitions to turbulent airflow. Further, the blade add-on component includes a base portion having a leading edge and a trailing edge extending generally in a first direction. Thus, the base portion includes one or more edge features formed within at least one of the leading edge or trailing edge, with the one or more edge features being non-parallel with respect to the first direction so as to reduce laminar boundary layer instability noise.

In yet another aspect, the present disclosure is directed to a rotor blade assembly for a wind turbine. The rotor blade assembly includes a rotor blade having surfaces defining a pressure side, a suction side, a leading edge, and a trailing edge extending between a blade tip and a blade root. Further, the rotor blade assembly includes at least one vortex generator mounted within a laminar flow region on the pressure side or the suction side of the rotor blade. The laminar flow region encompasses areas of the rotor blade where laminar airflow transitions to turbulent airflow. Moreover, the vortex generator includes a base portion and at least one airflow modifying element extending from the base portion, with the base portion having a leading edge and a trailing edge. Further, the rotor blade assembly also includes at least one boundary-layer trip element mounted upstream of the vortex generator. Thus, the boundary-layer trip element is configured to disrupt the airflow upstream of the vortex generator so as to force laminar airflow to turbulent airflow, thereby eliminating noise caused by laminar boundary layer instability.

In one embodiment, the boundary-layer trip element may be a surface feature with a height configured to disrupt the airflow upstream of the vortex generator, a surface feature having a certain roughness (e.g. sand paper, sand grains embedded in the paint, a rough paint surface), and/or one or more recesses.

In another embodiment, the boundary-layer trip element(s) may be mounted at a predetermined distance upstream of the vortex generator. As such, the predetermined distance is also configured to disrupt the airflow upstream of the vortex generator so as to force laminar airflow to turbulent airflow. More specifically, in certain embodiments, the predetermined distance may range from about 1 centimeter to about 40 centimeters.

In further embodiments, the height of the boundary-layer trip element may range between approximately 0.1 millimeters and approximately 2.5 millimeters. More specifically, in certain embodiments, the height of the boundary-layer trip element may range between approximately 0.5 millimeter and approximately 1.5 millimeters.

In another embodiment, the predetermined distance is determined as a function of a boundary layer thickness at a mounting location of the vortex generator. In further embodiments, the boundary-layer trip element may include tape, one or more wires, one or more recesses, blowing holes or slots, or a surface roughness. In additional embodiments, the boundary-layer trip elements can be span-wise, continuous, or discontinuous, provided that the laminar boundary layer has transitioned into turbulent airflow over a sufficiently long span-wise fraction of the airfoil such that the feedback loop is disrupted.

It should be further understood that the rotor blade assembly may also include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The present invention is described herein as it may relate to a component of a wind turbine blade. It should be appreciated, however, that the unique vortex generator configuration (or blade add-on component) in accordance with principles of the invention is not limited to use on wind turbine blades, but is applicable to any type of airfoil or flow surface that would benefit from the modified aerodynamic characteristics provided by the vortex generator. Examples of such surfaces include airplane wings, boat hulls, sails, and so forth.

Generally, the present disclosure is directed to a blade add-on component, such as vortex generators, trailing edge features, deflected flap edges, and/or slats, for a rotor blade of a wind turbine having noise-reducing features. In other words, any blade add-on component creating a uniform discontinuity in the airflow is within the scope and spirit of the invention. For example, the blade add-on component(s) are mounted within a laminar flow region on the pressure side or the suction side of the rotor blade and have a base portion with a leading edge and a trailing edge that extend generally in a first direction, e.g. that is substantially parallel to a laminar boundary-layer receptivity line. Thus, the base portion includes one or more edge features formed within at least one of the leading edge or trailing edge, with the one or more edge features being non-parallel with respect to the first direction so as to reduce laminar boundary layer instability noise. As such, the blade add-on component(s) of the present disclosure avoid undesired acoustic tones when certain add-ons are installed on a wind turbine rotor blade.

Figure 1:
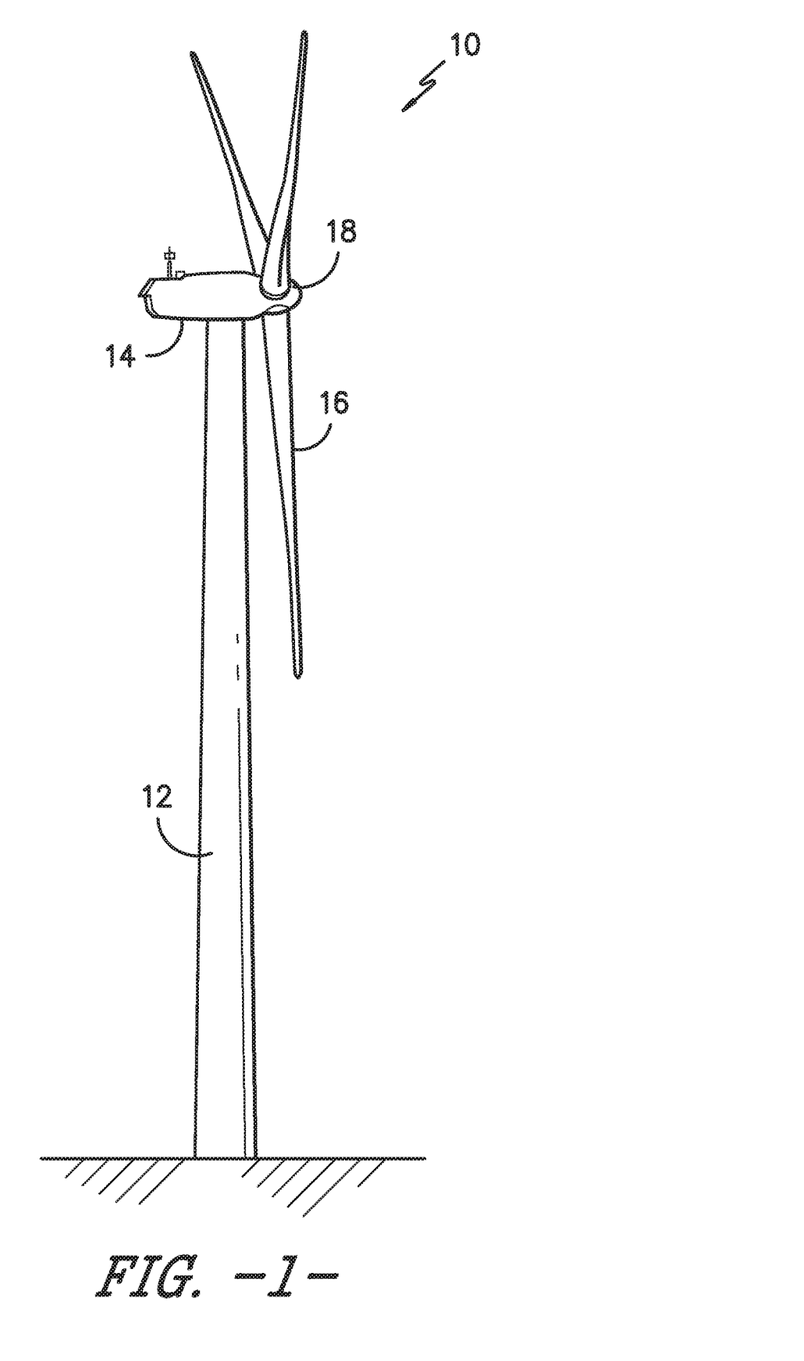
FIG. 1 illustrates a perspective view of one embodiment of a wind turbine according to the present disclosure.

Referring now to the drawings, FIG. 1 illustrates a perspective view of one embodiment of a wind turbine 10 according to the present disclosure. As shown, the wind turbine 10 includes a tower 12 with a nacelle 14 mounted thereon. A plurality of rotor blades 16 are mounted to a rotor hub 18, which is in turn connected to a main flange that turns a main rotor shaft (not shown). The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Figure 2:
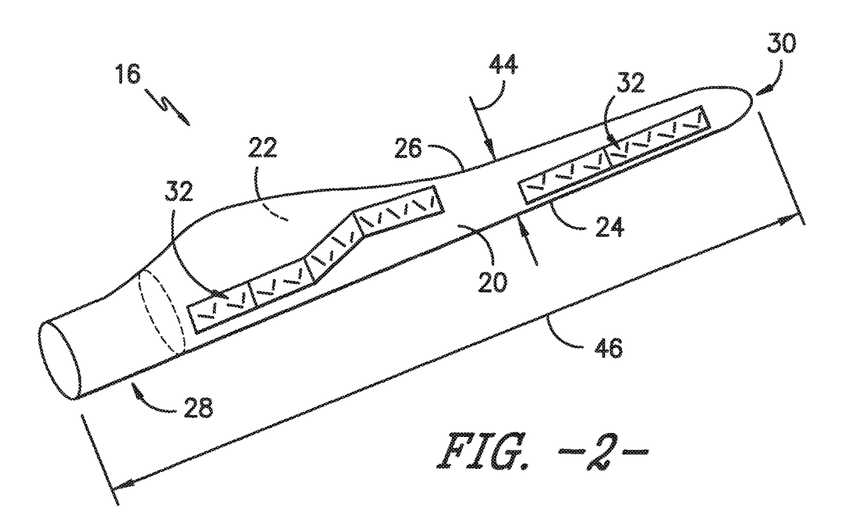
FIG. 2 illustrates a perspective view of one embodiment of a rotor blade assembly according to the present disclosure.

Referring now to FIG. 2, a wind turbine blade 16 incorporating aspects of the invention is illustrated. As shown, the rotor blade 16 includes a suction side surface 20, a pressure side surface 22, a leading edge 24, and a trailing edge 26. Further, the rotor blade 16 extends from a root portion 28 to a tip portion 30. A plurality of unique vortex generators 32 in accordance with aspects of the invention described in greater detail below are placed at any location on either or both of the flow surfaces 20, 22 of the rotor blade 16. For example, as shown, the vortex generators 32 may be located at any location along the span 46 of the rotor blade and/or at any chord location. As used herein and illustrated in FIG. 2, a span 46 of the rotor blade 16 generally refers to the direction extending between the root portion 28 to the tip portion 30, whereas the chord 44 of the rotor blades 16 generally refers to the direction extending between the leading edge 24 to the trailing edge 26. Further, the vortex generators 32 may be disposed closer to the root portion 28 of the rotor blade 16 as compared to the tip portion 30, or closer to the tip portion 30 as compared to the root portion 28.

Figure 3:
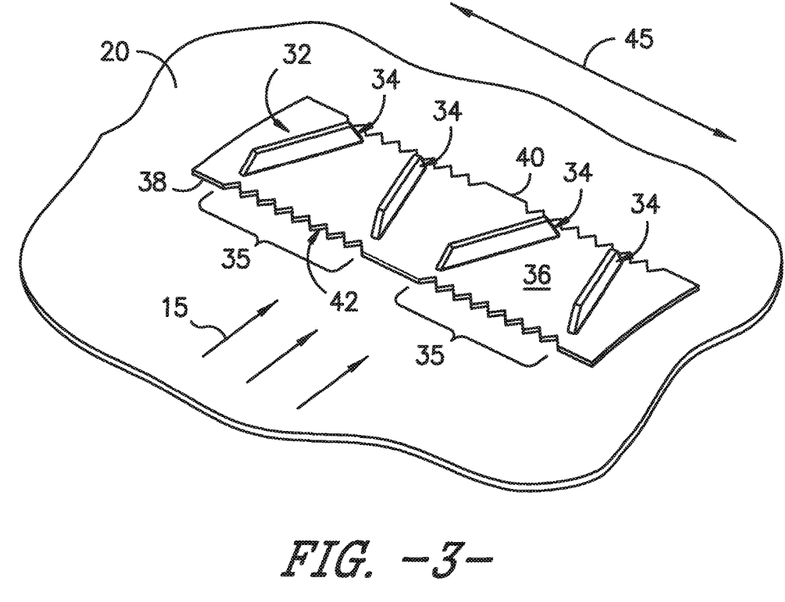
FIG. 3 illustrates a perspective view of one embodiment of a vortex generator mounted on a rotor blade according to the present disclosure.

In addition, as shown in FIGS. 2 and 3, the vortex generators 32 are depicted on the suction side surface 20 of the rotor blade 16. In additional embodiments, the vortex generators 32 of the present disclosure may also be mounted on the pressure side surface 22. Thus, the vortex generators 32 may be arranged in any suitable configuration on one of the blade surfaces 20, 22 so as to provide the desired airflow. Further, the vortex generator(s) 32 may be mounted to the exterior of the rotor blade 16 through the use of, for example, adhesive or suitable mechanical fasteners.

Figure 6:
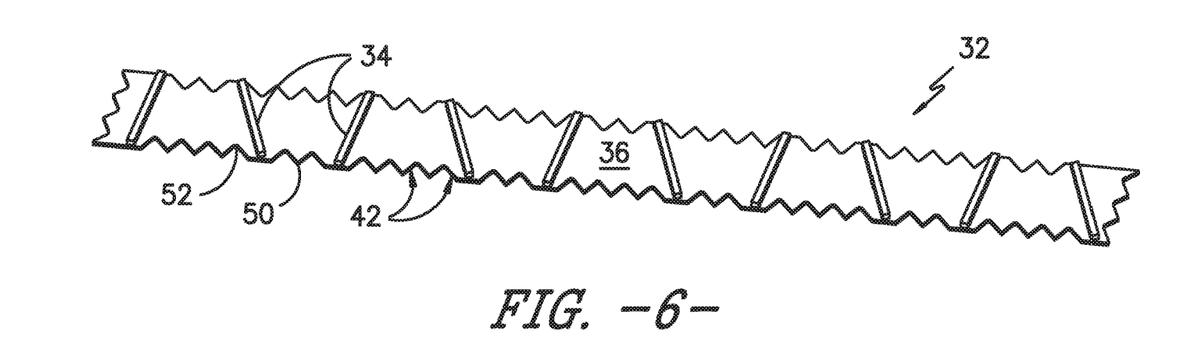
FIG. 6 illustrates a top view of another embodiment of a vortex generator having noise-reducing features according to the present disclosure.

Further, as shown specifically to FIG. 3, the vortex generator(s) 32 includes a base portion 36 with at least one airflow modifying element 34 extending substantially perpendicular therefrom. For example, as shown in FIGS. 3 and 6, the vortex generators 32 include a base portion 36 having pairs 35 of airflow modifying elements 35 or fins mounted at opposite angles with respect to each other. More specifically, corresponding pairs 35 of airflow modifying elements 34 may be angled away from each other, e.g. at a 45-degree angle, an acute angle, or an obtuse angle. For example, as shown in FIG. 3, the corresponding pairs 35 of airflow modifying elements 34 form angle θ with respect to the wind direction 15.

Moreover, as shown in FIG. 3, the base portion 36 has a leading edge 38 and a trailing edge 40, with the leading edge 38 being the edge that faces into the wind direction 15. More specifically, in the illustrated embodiment, four airflow modifying elements 34 are extending from the base portion 36. In further embodiments, more than four or less than four airflow modifying elements 34 may extend from the base portion 36.

Figure 4:
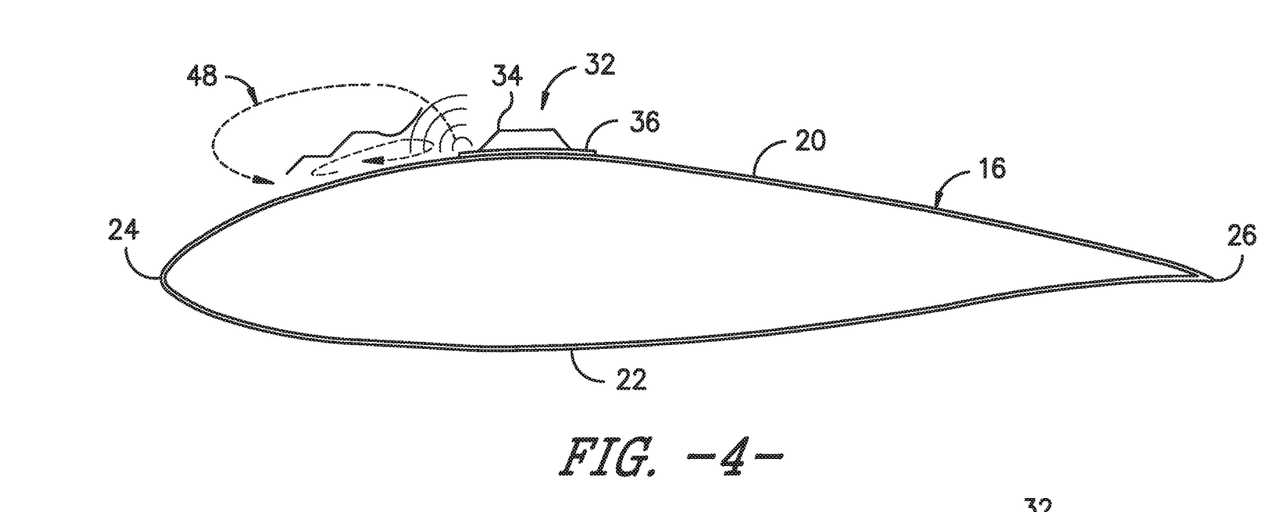
FIG. 4 illustrates a cross-sectional view of one embodiment of a rotor blade having a vortex generator mounted thereto according to the present disclosure, particularly illustrating a feedback loop generated upstream of the vortex generator.

In particular embodiments, the vortex generators 32 are mounted on the pressure or suction sides 20, 22 within a laminar flow region. Further, as shown, the vortex generators 32 are mounted to the rotor blade 16 in a first direction such that they are generally parallel to a laminar receptivity line 45. As used herein, the "laminar flow region" of the rotor blade 16 generally refers to the location of the blade where laminar airflow transitions to turbulent airflow. As such, the laminar flow region is dependent on many factors, including but not limited to flow speed, chord length, airfoil pressure distribution, the location of the adverse pressure gradients (i.e. where such pressure gradients start), angle of attack, and/or surface roughness. More specifically, as shown in FIG. 4, laminar flow separation can occur upstream of the vortex generator(s) 32, which can introduce airflow instabilities. Flow instabilities travel downstream and are amplified and scattered by the discontinuity created by the base portion 36 of the vortex generator(s) 32. The scattered acoustic waves propagate upstream, where they interact with and amplify the flow instabilities. As a result, a feedback loop 48 is created, and multiple acoustic tones are generated.

Figure 5:
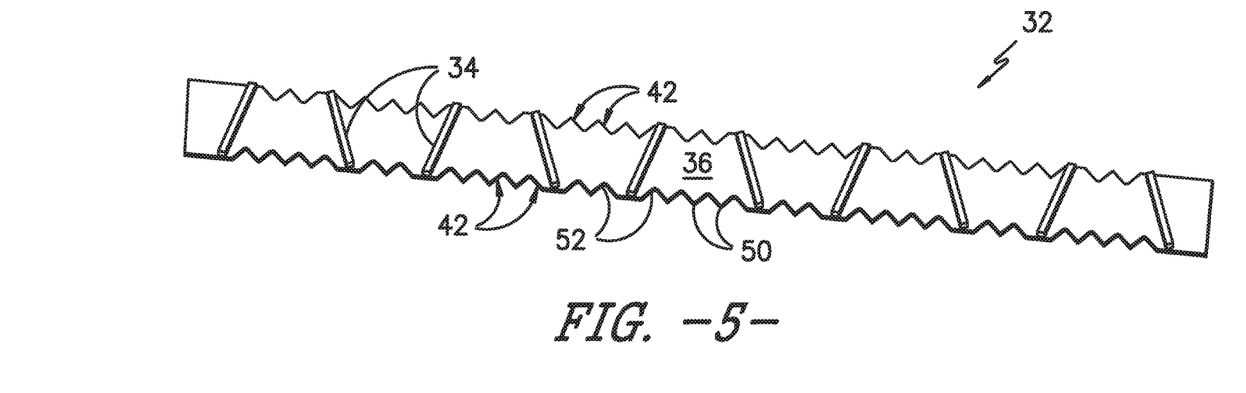
FIG. 5 illustrates a top view of one embodiment of a vortex generator having noise-reducing features according to the present disclosure.
Figure 7:
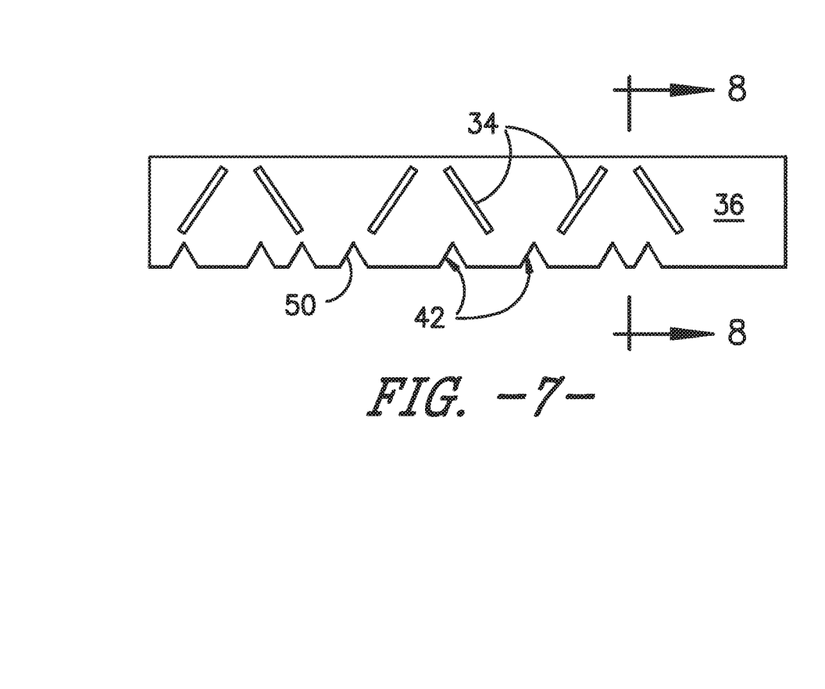
FIG. 7 illustrates a top view of still another embodiment of a vortex generator having noise-reducing features according to the present disclosure.

Thus, as shown generally in FIGS. 3, 5, and 6, the base portion 36 includes one or more edge features 42 formed within at least one of the leading edge 38 or trailing edge 40 and being locally non-parallel with respect to the first direction, i.e. the laminar receptivity line 45 so as to reduce laminar boundary layer instability noise. For example, as shown in FIGS. 5 and 6, the base portion 36 may include one or more edge features 42 formed within both the leading edge 38 and the trailing edge 40 thereof. In another embodiment, as shown in FIG. 6, the base portion 36 may include one or more edge features 42 formed around an entire periphery thereof. In still another embodiment, as shown in FIG. 3, the base portion 36 may include one or more edge features 42 upstream or downstream of corresponding pairs 35 of airflow modifying elements 34. Further, as shown in FIG. 7, the edge features 42 may be formed in only one side of the base portion 36.

In additional embodiments, the edge features 42 may include serrations, recesses, slits, slots, holes, channels, protrusions, ribs, or similar. Further, as shown in FIGS. 3 and 5-7, the base portion 36 of the vortex generator 32 includes a plurality of serrations 50. More specifically, the serrations 50 may have any suitable shape, including but not limited to U-shape, V-shape, C-shape, sinusoidal shape, rectangular shape, or a square shape. For example, the edge features 42 illustrated generally in FIGS. 3 and 5-7 include serrations 50 having a substantially V-shaped cross-section. Further, as shown, adjacent serrations 50 may generally define indentations 52 therebetween. While in exemplary embodiments, the serrations 50 are generally V-shaped, defining generally V-shaped indentations 52, in alternative embodiments the serrations 50 and indentations 52 may be U-shaped, or may have any other shape or configuration suitable for reducing laminar boundary layer instability noise. For example, in some embodiments, the serrations 50 and indentations 52 may be generally sinusoidal or squared-sinusoidal.

It should be understood that, while exemplary embodiments of the edge features 42 are discussed herein, an edge feature according to the present disclosure may have any suitable characteristics, such as a width, length, shape, or orientation, depending on the desired noise reduction characteristics for the vortex generator 32. Further, in exemplary embodiments, each individual edge feature 42 may have individual characteristics as required to achieve optimum noise reduction characteristics. In alternative embodiments, however, various groups of edge features 42 may have similar characteristics, or all edge features 42 may have similar characteristics, depending on the desired noise reduction characteristics for the vortex generator 32.

Figure 8:
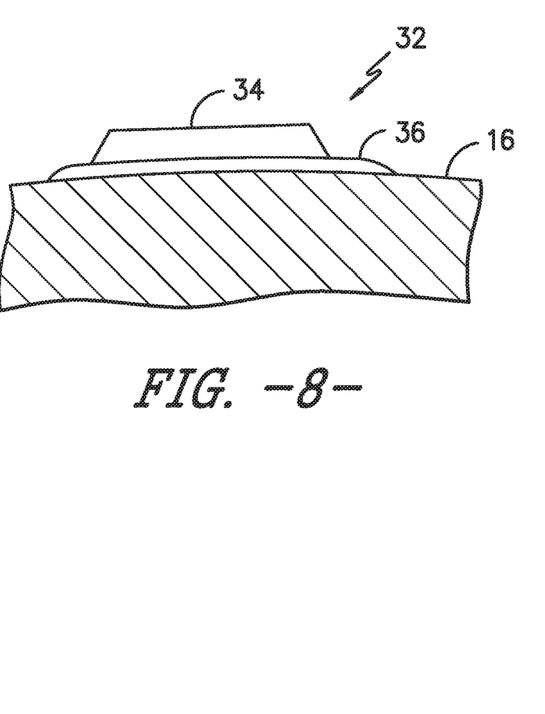
FIG. 8 illustrates a cross-sectional side view of one embodiment of a vortex generator mounted to a rotor blade according to the present disclosure, particularly illustrating a base portion of the vortex generator having a tapering discontinuity.

In addition, as shown, the edge features 42 may have a uniform pattern. Alternatively, as shown in FIG. 7, the edge features 42 formed within the base portion 36 may have a random pattern. In additional embodiments, as shown in FIG. 8, the edge features 42 may taper (or be chamfered) towards one of the pressure or suction sides 20, 22 of the rotor blade 16.

It should be understood that the vortex generator(s) 32 described herein may be constructed of any suitable material. For example, in one embodiment, the vortex generator(s) 32 may be formed of a relatively rigid material so as to develop the desired aerodynamic properties, e.g. plastic or metal material. Alternatively, the vortex generator(s) 32 may be constructed of a flexible, low durometer material.

Figure 9:
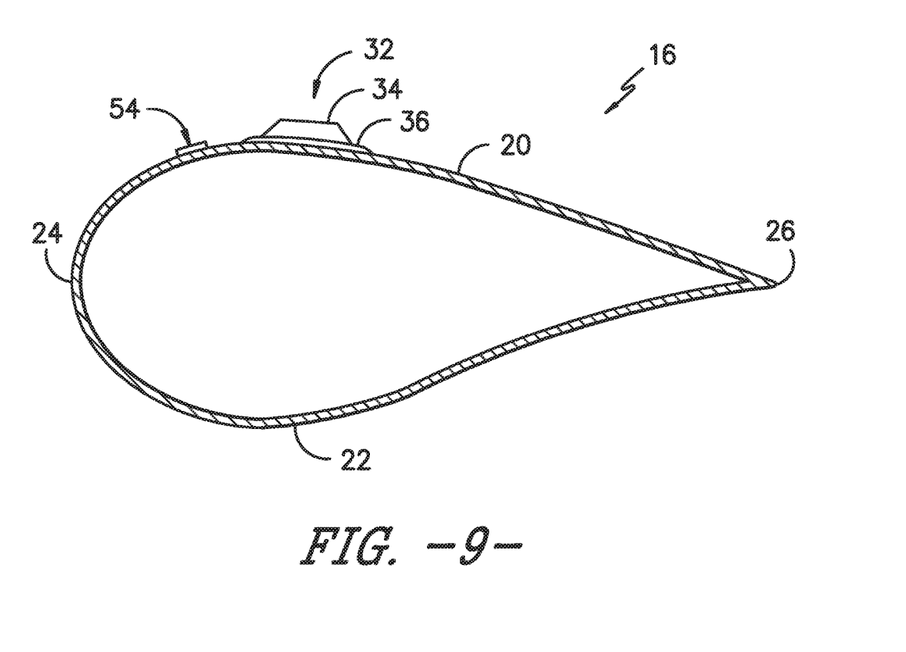
FIG. 9 illustrates a cross-sectional view of one embodiment of a rotor blade having a vortex generator mounted thereto according to the present disclosure, particularly illustrating a boundary layer trip element mounted upstream of the vortex generator so as to reduce laminar boundary layer instability noise.

Referring now to FIG. 9, a cross-sectional view of another embodiment of a rotor blade assembly according to the present disclosure is illustrated. As shown, the rotor blade assembly includes rotor blade 16, at least one vortex generator 32 mounted within the laminar flow region on either the pressure or suction sides 20, 22 of the rotor blade 16, and at least one boundary-layer trip element 54 mounted upstream of the vortex generator 32.

For example, in certain embodiments, the boundary-layer trip element 54 may be a surface feature of a height H configured to disrupt the airflow upstream of the vortex generator 32 so as to force laminar airflow to turbulent airflow, thereby eliminating noise caused by laminar boundary layer instability. More specifically, in one embodiment, the height H of the boundary-layer trip element 54 may range between approximately 0.1 millimeters and approximately 2.5 millimeters. Further, in certain embodiments, the height H of the boundary-layer trip element 54 may range between approximately 0.5 millimeter and approximately 1.5 millimeters. Alternatively, the boundary-layer trip element 54 may be a surface feature having a certain roughness (e.g. sand paper, sand grains embedded in the paint, a rough paint surface), blowing holes or slots, and/or one or more recesses. More specifically, in one embodiment, the boundary-layer trip element 54 may include tape or one or more wires.

Figure 10:
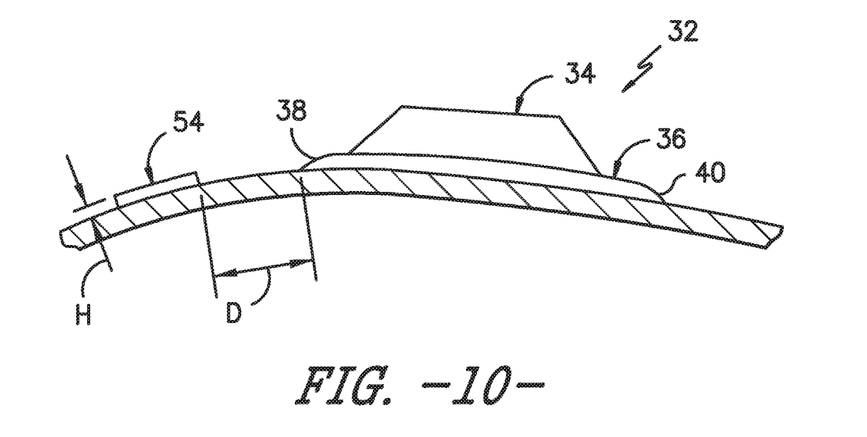
FIG. 10 illustrates a detailed view of the embodiment of FIG. 9.

In additional embodiments, as shown in FIG. 10, the boundary-layer trip element 54 may be mounted at a predetermined distance D upstream of the vortex generator 32. As such, the predetermined distance D is configured to disrupt the airflow upstream of the vortex generator 32 so as to force laminar airflow to turbulent airflow. More specifically, in certain embodiments, the predetermined distance D may range from about 1 centimeter to about 40 centimeters. In another embodiment, the predetermined distance D may be determined as a function of a boundary layer thickness at a mounting location of the vortex generator 32.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
a rotor blade having surfaces defining a pressure side, a suction side, a leading edge, and a trailing edge extending between a blade tip and a blade root; and,
at least one blade add-on component mounted in a laminar flow region on at least one of the pressure side or the suction side of the rotor blade, the laminar flow region encompassing areas of the rotor blade where laminar airflow transitions to turbulent airflow, the blade add-on component comprising a base portion having a leading edge and a trailing edge, extending in a first direction,
wherein the base portion comprises one or more edge indentions formed into at least one of the leading edge or the trailing edge of the base and terminating before an edge of at least one airflow modifying element, the one or more edge indentions being non-parallel with respect to the first direction so as to reduce laminar boundary layer instability noise; wherein one or more edge indentions is chamfered towards at least one of the pressure side or the suction side of the rotor blade.

2. A rotor blade assembly for a wind turbine, comprising:
a rotor blade having surfaces defining a pressure side, a suction side, a leading edge, and a trailing edge extending between a blade tip and a blade root; and,
at least one vortex generator mounted in a laminar flow region on at least one of the pressure side or the suction side of the rotor blade, the laminar flow region encompassing areas of the rotor blade where laminar airflow transitions to turbulent airflow, the vortex generator comprising a base portion and at least one airflow modifying element extending from the base portion, the base portion having a leading edge and a trailing edge extending in a first direction,
wherein the base portion comprises one or more edge indentions formed into at least one of the leading edge or the trailing edge of the base and terminating before an edge of the at least one airflow modifying element, at least one of the one or more edge indentions being non-parallel with respect to the first direction so as to reduce laminar boundary layer instability noise; wherein one or more edge indentions is chamfered towards at least one of the pressure side or the suction side of the rotor blade.

3. The rotor blade assembly of claim 2, wherein the base portion comprises the one or more edge indentions formed into both the leading edge and the trailing edge thereof.

4. The rotor blade assembly of claim 2, wherein the base portion further comprises the one or more edge indentions formed around an entire periphery thereof, a first plurality of the one or more edge indentions being non-parallel with respect to the first direction and a second plurality of the one or more edge indentions being parallel with respect to the first direction.

5. The rotor blade assembly of claim 2, wherein the one or more edge indentions comprise at least one of serrations, recesses, slits, slots, holes, or channel.

6. The rotor blade assembly of claim 5, wherein the one or more indentions comprise the serrations, the serrations comprising at least one of a U-shape, a V-shape, a C-shape, a sinusoidal shape, a rectangular shape, or a square shape.

7. The rotor blade assembly of claim 2, wherein the base portion of the vortex generator comprises a plurality of edge indentions formed into at least one of the leading edge or trailing edge thereof, the plurality of edge indentions having a random pattern.

8. The rotor blade assembly of claim 2, wherein the base portion of the vortex generator comprises a plurality of edge indentions formed into at least one of the leading edge or trailing edge thereof, the plurality of edge indentions having a uniform pattern.

9. The rotor blade assembly of claim 2, wherein at least one of the airflow modifying elements comprises a fin extending generally perpendicular from the base portion.

10. A rotor blade assembly for a wind turbine, comprising:
a rotor blade having surfaces defining a pressure side, a suction side, a leading edge, and a trailing edge extending between a blade tip and a blade root;
at least one vortex generator mounted in a laminar flow region on at least one of the pressure side or the suction side of the rotor blade, the laminar flow region encompassing areas of the rotor blade where laminar airflow transitions to turbulent airflow, the vortex generator comprising a base portion and at least one airflow modifying element extending from the base portion, the base portion having a leading edge and a trailing edge, wherein the base portion comprises one or more edge indentions formed into at least one of the leading edge or the trailing edge of the base and terminating before an edge of the at least one airflow modifying element; and,
at least one boundary-layer trip element mounted upstream of the vortex generator, the boundary-layer trip element configured to disrupt the airflow upstream of the vortex generator so as to force laminar airflow to turbulent airflow, thereby eliminating noise caused by laminar boundary layer instability; wherein the one or more edge indentions is chamfered towards at least one of the pressure side or the suction side of the rotor blade.

11. The rotor blade assembly of claim 10, wherein the at least one boundary-layer trip element is mounted at a predetermined distance upstream of the vortex generator, the predetermined distance configured to disrupt the airflow upstream of the vortex generator so as to force laminar airflow to turbulent airflow, the predetermined distance ranging from about 1 centimeter to about 40 centimeters.

12. The rotor blade assembly of claim 10, wherein a height of the boundary-layer trip element ranges between approximately 0.1 millimeters and approximately 2.5 millimeters.

13. The rotor blade assembly of claim 10, wherein the predetermined distance is determined as a function of a boundary layer thickness at a mounting location of the vortex generator.

14. The rotor blade assembly of claim 10, wherein the boundary-layer trip element comprises at least one of tape, one or more wires, one or more blowing holes or slots, one or more recesses, or a surface roughness.

15. The rotor blade assembly of claim 10, wherein the one or more edge indentions comprise at least one of serrations, recesses, slits, slots, holes, or channels.

16. The rotor blade assembly of claim 10, wherein the base portion of the vortex generator comprises a plurality of edge indentions formed into at least one of the leading edge or trailing edge thereof, the plurality of edge indentions having a random pattern.

17. The rotor blade assembly of claim 10, wherein the base portion of the vortex generator comprises a plurality of edge indentions formed into at least one of the leading edge or trailing edge thereof, the plurality of edge indentions having a uniform pattern.

* * * * *